I. R. JOHNSON.
DIRECTION SIGNAL.
APPLICATION FILED MAY 18, 1921.

1,431,811.

Patented Oct. 10, 1922.
2 SHEETS—SHEET 1.

WITNESSES

INVENTOR
ISAAC R. JOHNSON

BY
ATTORNEYS

I. R. JOHNSON.
DIRECTION SIGNAL.
APPLICATION FILED MAY 18, 1921.
1,431,811.
Patented Oct. 10, 1922.
2 SHEETS—SHEET 2.
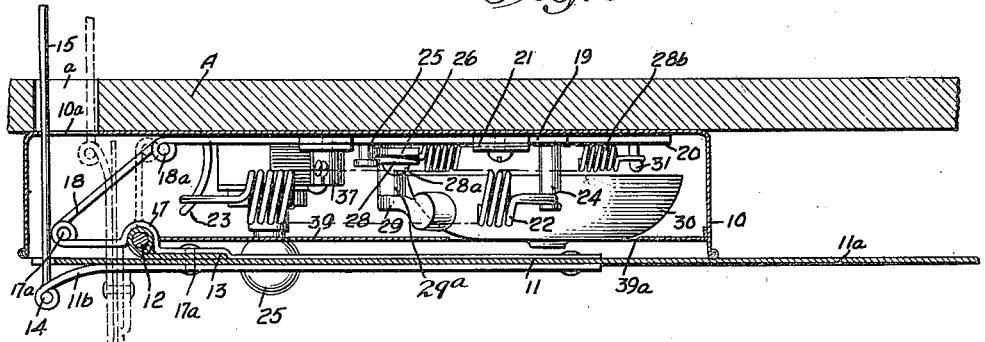
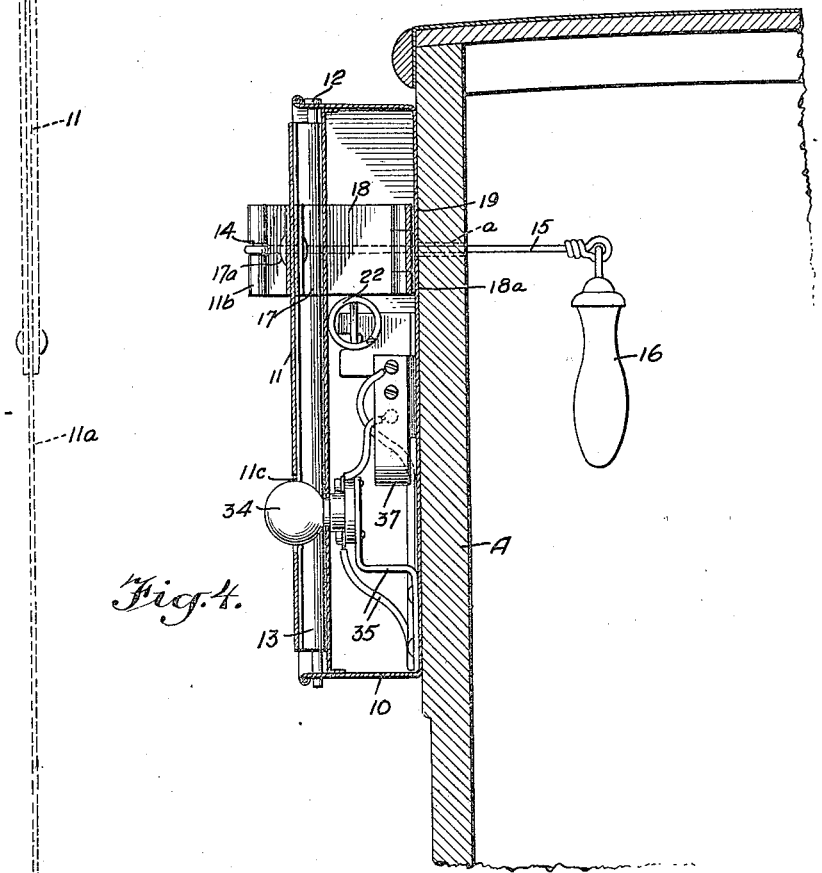
WITNESSES
INVENTOR
ISAAC R. JOHNSON
BY
ATTORNEYS Patented Oct. 10, 1922.

1,431,811

UNITED STATES PATENT OFFICE.

ISAAC R. JOHNSON, OF NEW YORK, N. Y.

DIRECTION SIGNAL.

Application filed May 18, 1921. Serial No. 470,679.

*To all whom it may concern:*

Be it known that I, ISAAC R. JOHNSON, a citizen of the United States, and a resident of the city of New York, borough of Manhattan, in the county and State of New York, have invented a new and Improved Direction Signal, of which the following is a description.

My invention relates to a signal to be mounted on an automobile or other vehicle to indicate the direction of turning.

The general object of my invention is to provide a novel signal of the indicated character adapted to be mounted at the sides of the vehicle adjacent to the driver's seat and each including a manually operated semaphore to be optionally operable to conspicuously indicate that the vehicle is about to turn to the right or to the left.

A further object of the invention is to provide an audible signal operable by the swinging of the semaphore as well as a light means to be utilized at night and in the form of an electric lamp the circuit of which is closed or broken with the swinging of the semaphore.

A more specific object of the invention is to provide a practical embodiment of the operative parts making for simplicity and for precision in operation for the sounding of the audible alarm or the closing of the light circuit.

The nature of the invention and its distinctive features and advantages will clearly appear as the description proceeds.

Reference is to be had to the accompanying drawings forming a part of this specification, it being understood that the drawings are merely illustrative of a practical example of the invention.

Figure 3 is a longitudinal section on the line 3—3, Figure 2;

Figure 4 is a cross section on the line 4—4, Figure 2, showing the signal mounted on the vehicle.

In carrying out my invention in accordance with the illustrated example a box 10 is provided which in practice is generally of oblong shape and comparatively shallow. The box A is secured to the side of a vehicle 10 by any suitable means to lie in a plane parallel with said side. Two of the signals are employed in practice, one at each side of the driver's seat at the exterior of the vehicle.

Figure 1:
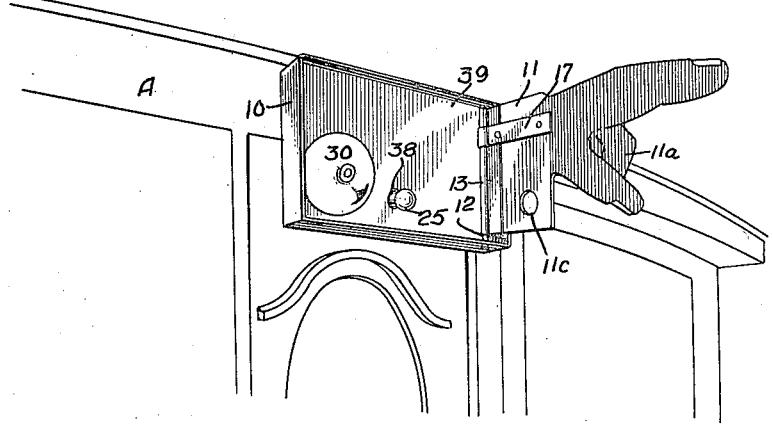
Figure 1 is a perspective view of a direction signal embodying my invention, illustrating the same mounted on a vehicle shown in part, the semaphore being in the signalling position.

On the box at one end at the front thereof is a semaphore 11 usually of sheet metal terminating in an indicating member $11^a$, here shown as simulating a hand. The semaphore is hinged by a pivot 12 or the like and a hinge strap 13, suitably fastened to the semaphore and loosely embracing said pin. The semaphore 11 is so disposed as to lie when out of signal position against the front of the box 10 and parallel with the plane thereof, the indicating element $11^a$ extending beyond the box in practice in order to have a dimension to be conspicuous when swung to the display disposition of Figure 1.

Figure 2:
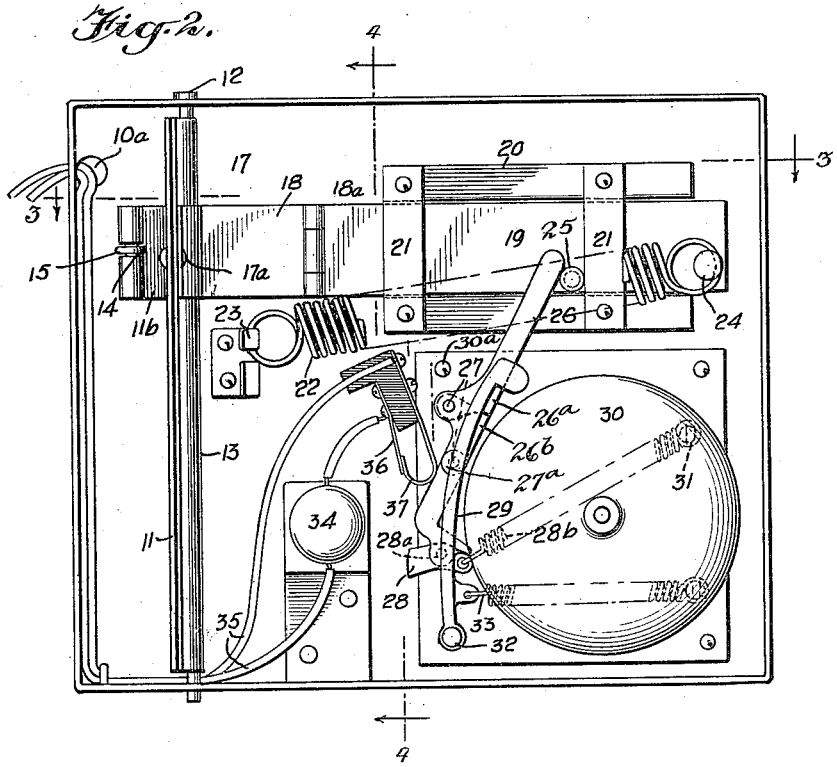
Figure 2 is a front view with the signal in position of Figure 1, the fixed cover plate employed on the signal box being omitted.

The semaphore or a rigid member appurtenant thereto extends rearwardly beyond the pivot 12 and has secured thereto by a pin 14 or the like a pull wire or cord 15 which extends, in practice, through a hole $10^a$ in the back of the box and through a registering hole $a$ in the side of the vehicle A, the inner end of the pull cord having a suitable handle 16 to be grasped by the driver of the vehicle. The arrangement is such that an inward pull on the wire 15 will swing the semaphore 11 with the pivot pin 12 as an axis from its position against the front of the box as in Figure 3 to the outer display position at right angles to the box or substantially so as in Figures 1 and 2.

A lever member 17 is formed on or secured to the semaphore 11 to project rearward of the pivot pin 12 and said lever is pivoted as at $17^a$ to one end of a link 18 within the box 10, the opposite end of said link being pivoted as at $18^a$ to a slide 19, disposed flat against the bottom of the box 10 and movable in a suitable guide here shown as consisting of longitudinal guide bars 20 and transverse keeper bars 21. A coil retractile spring 22 is suitably secured at one end as at 23 in the box 10 at the bottom, the opposite end being engaged by a pin 24 or the like on the slide 19 so that the spring exerts a force on the slide 19 tending to maintain the same in a position with the semaphore 11 in the inner position as in Figure 3. Thus, upon the signal being swung to the display position upon a pull of the wire 15 and as soon as said wire is released, the spring 22 can act to restore the signal to the inner position.

On the slide 19 is a trip 25 which may be shown in the form of a pin and which is adapted to engage one end of lever 26, said lever being divided into two sections 26$^a$, 26$^b$, pivotally connected together by a pin 27 and preferably held in an aligned position with respect to each other by any type of spring (not shown). The section 26$^b$ is pivoted adjacent its center on a pivot member 27$^a$ affixed to the base of the box, and to the free end of the section 26$^b$ is pivotally connected a pawl 28 adapted to engage a projection or a shoulder 29$^a$ adjacent the pivoted end of clapper 29. The pawl 28 is provided with an eye adapted to accommodate or receive one end of spring 28$^b$, the other end of which is secured to any fixed part, as at 31. A spring 33 influences clapper 29.

When the slide 19 is actuated by moving the semaphore 11 the free end of section 26$^a$ is acted upon by trip 25, causing both sections 26$^a$, 26$^b$ to swing in unison on pivot 27 and thereby drawing the pawl 28 over the shoulder 29$^a$ until said pawl passes on one side of said shoulder to engage it. The two sections swing in unison on pivot 27$^a$ until the section 26$^a$ reaches trip 30$^a$, where section 26$^a$ is prevented from advancing further, and at which instance, the section 26$^b$ is forced to swing on pivot 27$^a$ in a direction reverse to the previous movement, causing the free end of pawl 28 to engage the side face of the shoulder 29$^a$, forcing thereby clapper 29 away from the bell 30 until the pawl disengages said shoulder, leaving the clapper to return toward the bell under the action of spring 33.

In order to provide for illuminating the signal at night, I provide a lamp circuit including a circuit closer controlled by the lever 26 for which purpose in the illustrated example an electric lamp 34 is provided and the conductors 35 of the lamp circuit are connected respectively with the fixed contact 36 and the movable resilient contact 37, the latter contact being adapted to be pressed by the lever 26, in the movement of the lever to cause an operation of the clapper 29. Conductor wires 35 are shown as leading through the hole 10$^a$ in the box 10. The electric lamp protrudes through a hole 38 formed in a fixed front plate 39 of the box 10 and through a hole 11$^c$ in the semaphore 11 when the semaphore is in the inner position.

With the described construction when a pull is exerted on the wire 15 and the semaphore 11 swung to the signalling position, the lever arm 17 will, through the link 18, move the slide 19 in a direction for its pin 25 to trip the lever 26, thereby rocking the lever on its fulcrum 27. The pawl 28 on the lever will engage the clapper 29 and swing the same on its pivot 32 until the relative positions of the pawl and clapper are such that the pawl will slip from the clapper, as usual, the spring 28$^b$ yielding to the slight swinging movement of the pawl at its pivot 28$^a$ releasing itself from the clapper. Upon release of the clapper from the pawl 28, the clapper will be thrown by its spring 33 against the gong 30. In the movement of the lever 26 in tripping the clapper 29, said lever will also engage the movable contact 37 and press the same into engagement with the fixed contact 36 and closing the lamp circuit provided that the usual manually operable switch (not shown) in the circuit is closed.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A direction signal for vehicles comprising a box, adapted to be attached to the vehicle a semaphore pivotally mounted near one end adjacent to an end of the box to assume a position lying against the front of the box or a display position at approximate right angles to the plane of the box, manually operable means connected with said semaphore rearward of its pivot, for throwing the semaphore to display position, a slide in said box and connected with the semaphore to be moved by the semaphore when the latter moves to display position, and a spring acting on said slide and tending to maintain the same in position with the semaphore in the first-mentioned position.

2. A direction signal for vehicles comprising a box, adapted to be attached to the vehicle, a semaphore pivotally mounted near one end thereof and adapted to assume a position lying against the front of the box or to a display position at approximate right angles to the plane of the box, manually operable means connected with said semaphore, a slide in said box, guide means for said slide, a link connecting said slide with the semaphore rearward of its pivot, and a spring tending to restore said slide and semaphore after movement of the semaphore to display position.

3. A direction signal comprising a box, adapted to be attached to the vehicle a semaphore pivotally mounted near one end thereof to swing from a position approximately parallel to the plane of the box, or to a display position at approximately right angles to said plane, a member rigid with said semaphore and extending rearward of the pivot, a pull means connected with said member, a second member on said semaphore and extending rearward of the pivot; a slide in the box and connected with said second member to be moved by the latter with the movement of the semaphore to display position, and a spring acting on said slide to restore the same and the semaphore after movement of the slide by the semaphore.

4. A direction signal for vehicles, comprising a box, adapted to be attached to the vehicle a semaphore pivotally mounted on said box to assume a position approximately parallel with the plane of the box or to a display position at approximately right angles to said plane, manually operable means connected with said semaphore to throw it to display position, an element in the box and movable in response to a movement of the semaphore to display position, and an audible signal adapted to be operable by said element when moved by the semaphore.

ISAAC R. JOHNSON.